July 1, 1958   L. A. PHILIPP   2,841,132
RANGE
Filed Oct. 25, 1954   2 Sheets-Sheet 2
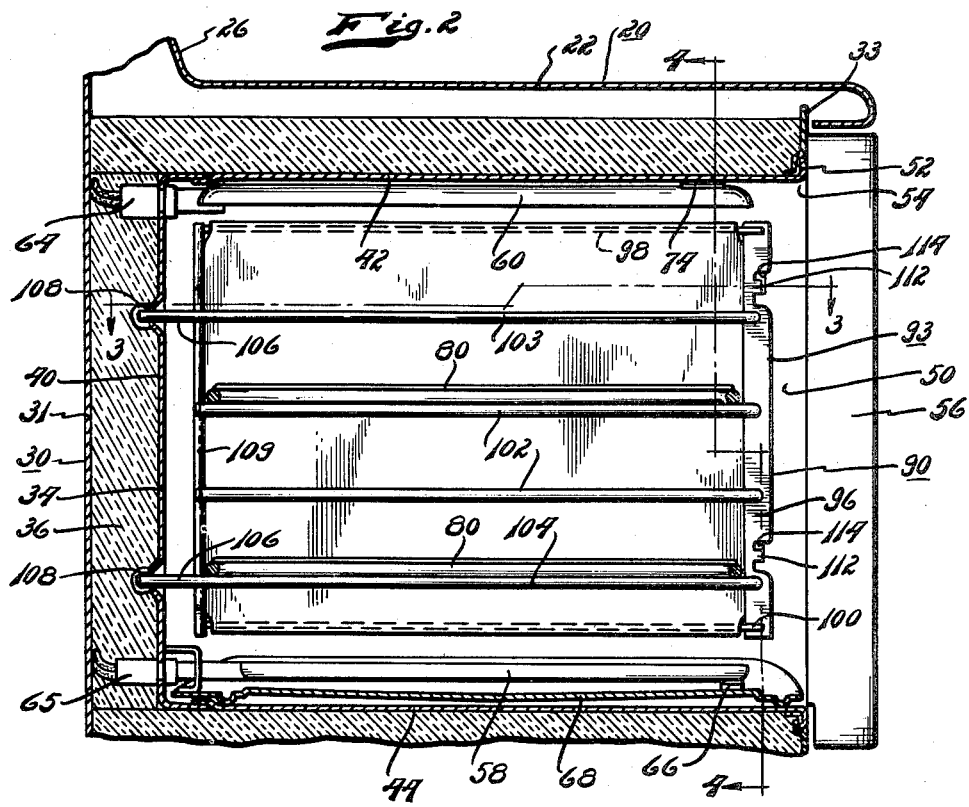
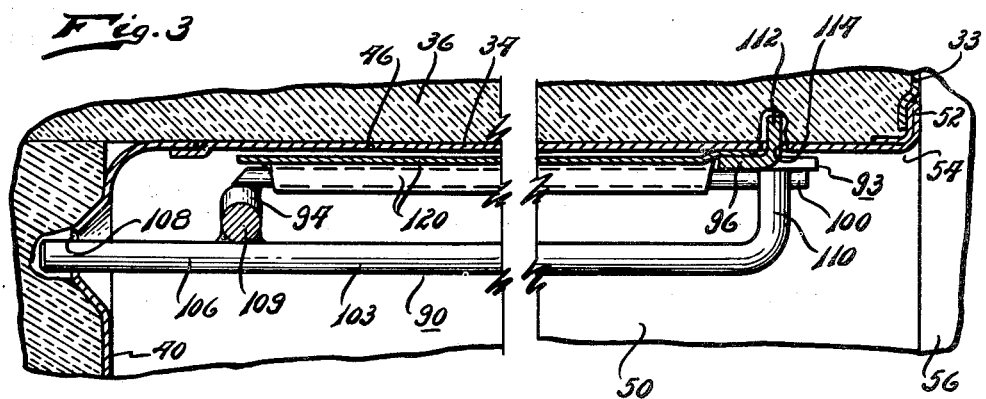
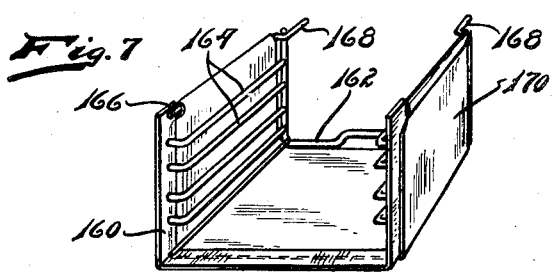
INVENTOR.
LAWRENCE A. PHILIPP
BY
Ralph E. Baker
ATTORNEY United States Patent Office 2,841,132
Patented July 1, 1958

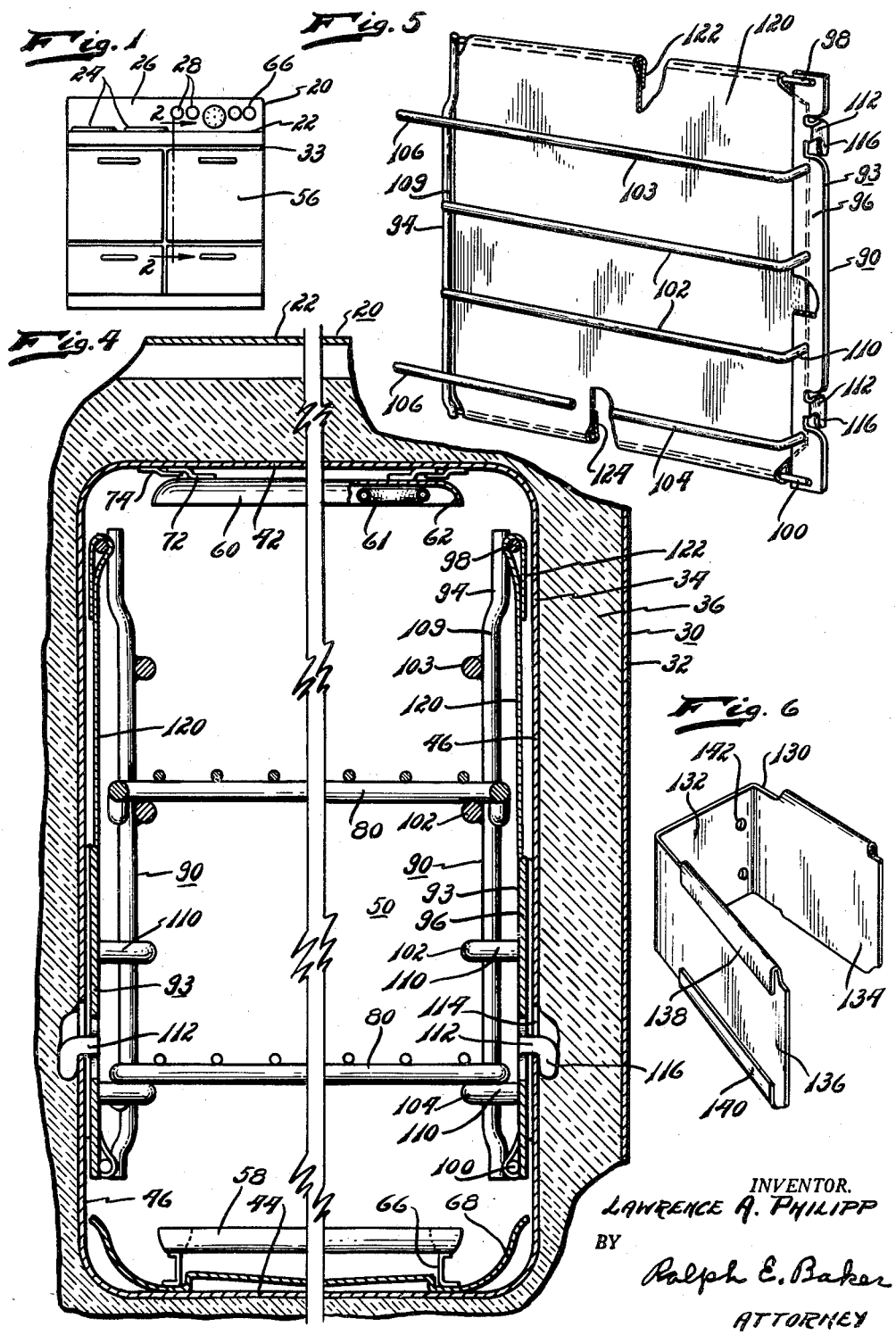

2,841,132
RANGE

Lawrence A. Philipp, Detroit, Mich., assignor to American Motors Corporation, Detroit, Mich., a corporation of Maryland Application October 25, 1954, Serial No. 464,241

2 Claims. (Cl. 126—19)

The present invention pertains to ranges and more particularly to ovens used in connection therewith.

It is an object of the present invention to provide protective and disposable wall shields or covering arrangement for the walls of an oven chamber whereby the protective shields covering the walls can be easily and readily removed and replaced as same become soiled from use.

Another object of the present invention is to provide removable supporting rails assembled in units for ready attachment or detachment from the walls of an oven chamber for supporting vertically spaced racks or shelves therein and arranged whereby the attachment and detachment may be made without the use of tools or the like.

Another object of the present invention is to provide walls in an oven chamber free from projecting protuberances or indentations to permit the placement thereagainst of protective and disposable wall shields or coverings carried by and readily removable with rail supporting assemblies that are removably attached to wall or walls of the oven chamber to facilitate their removal from the chamber to permit the replacement or cleaning of the shields when desired.

Another object of the present invention is provision of an oven arrangement and construction which is simple in construction, economical of manufacture and highly efficient in use.

Further objects and advantages of the present invention will be apparent from the following description, reference being had to the accompanying drawings wherein a preferred form of the present invention is clearly shown.

In the drawings:

Fig. 1 is a front view of a range embodying features of my invention;

Fig. 2 is an enlarged sectional view taken along the line 2—2 of Fig. 1;

Fig. 3 is a fragmentary enlarged sectional view taken along the line 3—3 of Fig. 2;

Fig. 4 is a fragmentary enlarged sectional view taken along the line 4—4 of Fig. 2;

Fig. 5 is a perspective view of rail assembly with shield member attached and shown removed from the range;

Fig. 6 is a perspective view of a modified form of a shield member; and

Fig. 7 is a perspective view of a further modified form of the invention.

Shown in the drawing is a range 20 having a table top 22 in which is inset electrical heating elements 24. Each heating element is connected to a suitable source of electrical energy and is operatively controlled by an electrical switch (not shown) operated by a respective knob 28 extending from a panel 26 that extends upwardly from the table top.

The range 20 is constructed with an outer shell or casing 30 having rear wall 31, sides 32 and a front wall 33. The table top 22 rests upon and forms the top wall for the shell 30. Secured within the shell or casing 30 is a liner 34 which is set in spatial relation to the walls of the casing for interposition of heat insulation material 36 therebetween.

The liner 34 is formed with a rear wall 40, a top wall 42, a bottom wall 44, and side walls or sides 46 to form an oven chamber or compartment 50. The sides, top and bottom walls of the liner extend forwardly to an opening in the front wall 32 of the range and is marginally flanged, as at 52, to overlie the edge of the front panel 32 to form an access opening 54 to the oven chamber 50. The access opening 54 is closed by a swingably mounted door 56.

Electrical heating elements 58 and 60 are positioned adjacent a respective bottom and top wall within the oven chamber. The heating element 58 is shown as an insulated type having its heating coil embedded and sealed within insulation, whereas the heating element 60 is an open coil type having a sinuously wound heating coil 61 supported on a reflector plate 62. However, any type of electrical heating elements may be used. Each heating element 58 and 60 is plugged into a respective receptacle 64 and 65 that are secured in and extend through the rear wall 40. The heating elements 58 and 60 are connected through their respective receptacle 64 and 65 to a suitable source of electrical energy and are operatively controlled by an electrical switch (not shown) operated by a knob 66 extending from panel 26. The heating elements are partially supported and held in position by their connection into receptacles 64 and 65. Further support is provided for heating element 58 by resting its forward section on legs 66 that rest upon a removable pan or tray 68. The upper heating element 60 is additionally supported by lugs 72 secured to the reflector plate 62 for engaging bracket 74 secured to top wall 42 within the oven chamber. The tray 68 rests upon the bottom wall 44 within the oven chamber and is removable therefrom for cleaning.

Vertically spaced racks or shelves 80 are provided within the oven chamber 50 which are supported on guide rail assemblies 90 that also permits the shelves to slide outwardly from the chamber as well as permit their removal. The guide rail assemblies 90 are set in opposed relation against side walls 46 of the oven chamber. Each assembly is independently insertable and removable from the chamber and each is self lockingly secured to a respective side wall. Each assembly is constructed with a frame 93 having vertical sides 94 and 96 interconnected at their ends by horizontal sides 98 and 100. A plurality of vertically spaced horizontally extended shelf supporting guide rails 102, except top rail 103, and bottom rail 104, are secured at their ends to the side frame members 94 and 96. The top rail 103 and bottom rail 104 extend beyond their securement to the side frame member 94 to provide extensions 106 adapted for insertion into openings 108 formed in the rear wall 40. The vertical side 96 of the frame 93 is preferably formed of relatively flat strip material adapted to be in contact with the side wall, whereas the opposite vertical side 94 is formed with its intermediate portion offset, as at 109, to be in spatial relation to the side wall and to which offset portion the rails 98, 100 and 102 are secured. The rails extend from the frame member 94 forwardly in space relation to the side wall and each is bent to form a right angle leg 110 for securement to side 96. The frame 93 is provided with rearwardly extended hook members 112 adapted to enter slots 114 formed in the side walls 46. The hook members 112 are preferably formed integrally with the side 96 and adapted to hold the side 96 in frictional contact with the side wall within the oven as the depending portion 116 of the hook engages the external side of the wall.

The frame 93 is preferably formed in size to approximate the height and width of the wall to which attached. The horizontal top and bottom sides 98 and 100 of the frame is preferably formed of relatively small diameter rod or wire and constructed to lie in close parallel proximity to the attached wall.

Secured to and extending between the top and bottom sides 98 and 100 and extending between sides 94 and 96 to slightly overlap the sides 94 and 96 are disposable wall protective shields or cover members 120. Each shield member 120 is preferably formed of aluminum foil, however, other suitable material that will withstand high temperatures, as maintained within the oven compartment, may be used. The shield members 120 are formed along their top and bottom edges with flaps 122 and 124 adapted to fold upon the respective top and bottom sides 98 and 100 for securement of the shield members to the rail assembly. The securement of the shields to the frame is effected prior to the assembly being inserted and secured within the oven chamber. The stiffness of the aluminum foil is such that when the flaps are folded over the connecting members it will retain its folded or creased position to permanently affix the shield member to the assembly as long as desired. Sewing or stitching the flaps to the main body, applying adhesives or clips are not necessary when aluminum foil is used, however, the use of other materials for a shield such securement may be necessary and the present arrangement and construction is such that such manner of securement may be made if desired. To further secure the shields member to protectively cover a wall the overlapping of the vertical sides 94 and 96 by the shield permits the frame to frictionally clamp the vertical edges of the shield to the wall preventing their curling or becoming caught and torn by the shelves sliding on their supporting rails.

Each shield member 120 is arranged to substantially cover and protect the surface area of a wall against any spatter or soiling that occurs in the use of the oven. As the soiling occurs on the one or both of the shields the oven chamber can be easily and quickly cleaned simply by removing the shelves and one or both of the shelf supporting assemblies 90. The shelf supporting rail assemblies are each quickly removed simply by applying upward pressure on the frame side 96 until the depending body portion of the hook members 112 are aligned and withdrawable through the slots 114. Withdrawing the assembly through access opening 54 from the oven chamber withdraws the assembly's extensions 106 from the openings 108 in the rear wall 40. Removal of the assembly from the oven chamber permits a ready removal and replacement of the shield member. If desired the soiled shield 120 may be removed, cleaned and replaced or new foil placed on the assembly. The assembly is easily and quickly replaced by insertion of extensions 106 into openings 108, the hooks passed through slots 114, and a slight downward pressure on the frame 96 locks the assembly and shield member to the wall. It will be noted that the above process of changing the shield member is accomplished without necessitating the use of any tools.

In the preferred arrangement described the rear wall of the oven chamber is not covered or protected against soiling. To provide protective covering there is shown in Fig. 6 a protective and disposable shield 130 having an intermediate or center portion 132 joined to side wall shield sections 134 and 136 each of which is provided with flaps 138 and 140 respectively. The center portion 132 is adapted to extend over and provide protective covering for the rear wall. The sections 134 and 136 are adapted for attachment by means of their flaps 138 and 140 to a respective rail assembly as described in the preferred form. The rail extension 106 as described in the rail assembly is adapted to project through openings 142 provided in the portion 132 to permit the rail assembly to be secured to the rear wall of the oven chamber.

This arrangement requires the simultaneous insertion of both side wall assemblies 90 into the oven chamber and provides protective covering for both sides and the rear wall of the oven.

In the further modified form shown in Fig. 7 there is a unitary construction for combining the two opposed rail assemblies. The construction comprises U-shaped frame members 160 and 162 in spaced relation which are joined together by vertically spaced paralleled shelf supporting rails 164. The frame members 160 and 162 are joined at their ends by rails 166 which are provided with extensions 168 that extend rearwardly beyond the frame member 162 adapted for insertion in openings in the rear wall of an oven chamber as described for extensions 106 described in the preferred form. A disposable wall protective shield 170 is attached by its ends to the top rails 166 to extend between the frame members 160 and 162. The shield extends downwardly between the paralleled sides of the frames and across the bight section. The arrangement is such that when the unit is inserted in an oven chamber the sides and the bottom wall of the chamber will be protectively covered by the shield. By this arrangement the need for a removable drip pan 68 as shown with the preferred form, see Figs. 2 and 4, is not required. Shields 130 and 170 may be aluminum foil.

Although preferred and modified forms have been illustrated and described in detail, it will be apparent to those skilled in the art that various other modifications may be made therein without departing from the scope of the appended claims.

I claim:

1. Range apparatus including an oven chamber having top, bottom, side and rear walls, supporting means adjacent each side wall, each of said supporting means comprising a frame including upper and lower horizontally extending members positioned adjacent a respective side wall, rear and front vertically extending frame members, said front frame members being flat strip members, a plurality of horizontally extending guide rails secured to said vertically extending frame members and extending inwardly therefrom into said oven chamber and inwardly from said supporting means, disposable foil wrapped around and extending between the upper and lower horizontally extending frame members and between said flat strip members and said oven side walls, securing means extending from said flat strip members into openings in said side walls to clamp said frames to said oven with said foil between said flat strip members and said side walls, and vertically spaced shelves placed on certain of said guide rails.

2. Range apparatus including an oven chamber having top, bottom, side and rear walls, supporting means adjacent each side wall, each of said supporting means comprising a frame including upper and lower horizontally extending members positioned adjacent a respective side wall, rear and front vertically extending frame members, said front frame members being flat strip members, a plurality of horizontally extending guide rails secured to said vertically extending frame members and extending inwardly therefrom into said oven chamber and inwardly from said supporting means, disposable foil wrapped around and extending between the upper and lower horizontally extending frame members and between said flat strip members and said oven side walls, securing means extending from said vertically extending frame members into openings in said side and rear walls to clamp said frames to said oven with said foil between said flat strip members and said side walls, and vertically spaced shelves carried by certain of said guide rails.

References Cited in the file of this patent
UNITED STATES PATENTS 1,013,313   Richardson _____ Jan. 2, 1912

(Other references on following page)

UNITED STATES PATENTS

| | | |
|---|---|---|
| 1,055,522 | Cumming | Mar. 11, 1913 |
| 1,620,602 | Mayer | Mar. 8, 1927 |
| 1,815,312 | Heise | July 21, 1931 |
| 2,236,992 | Broadley | Apr. 1, 1941 |
| 2,466,360 | Bitney | Apr. 5, 1949 |
| 2,466,859 | Northrup | Apr. 12, 1949 |
| 2,671,004 | Chadwick et al. | Mar. 2, 1954 |
| 2,744,519 | Means | May 8, 1956 |

FOREIGN PATENTS

| | | |
|---|---|---|
| 354,430 | Germany | Aug. 13, 1931 |
| 592,986 | Germany | Oct. 6, 1947 |